June 7, 1927.

A. E. BERGQUIST

POTATO MASHING MACHINE

Filed Sept. 4, 1925

A. E. Bergquist
INVENTOR

BY Victor J. Evans
ATTORNEY

WITNESS:

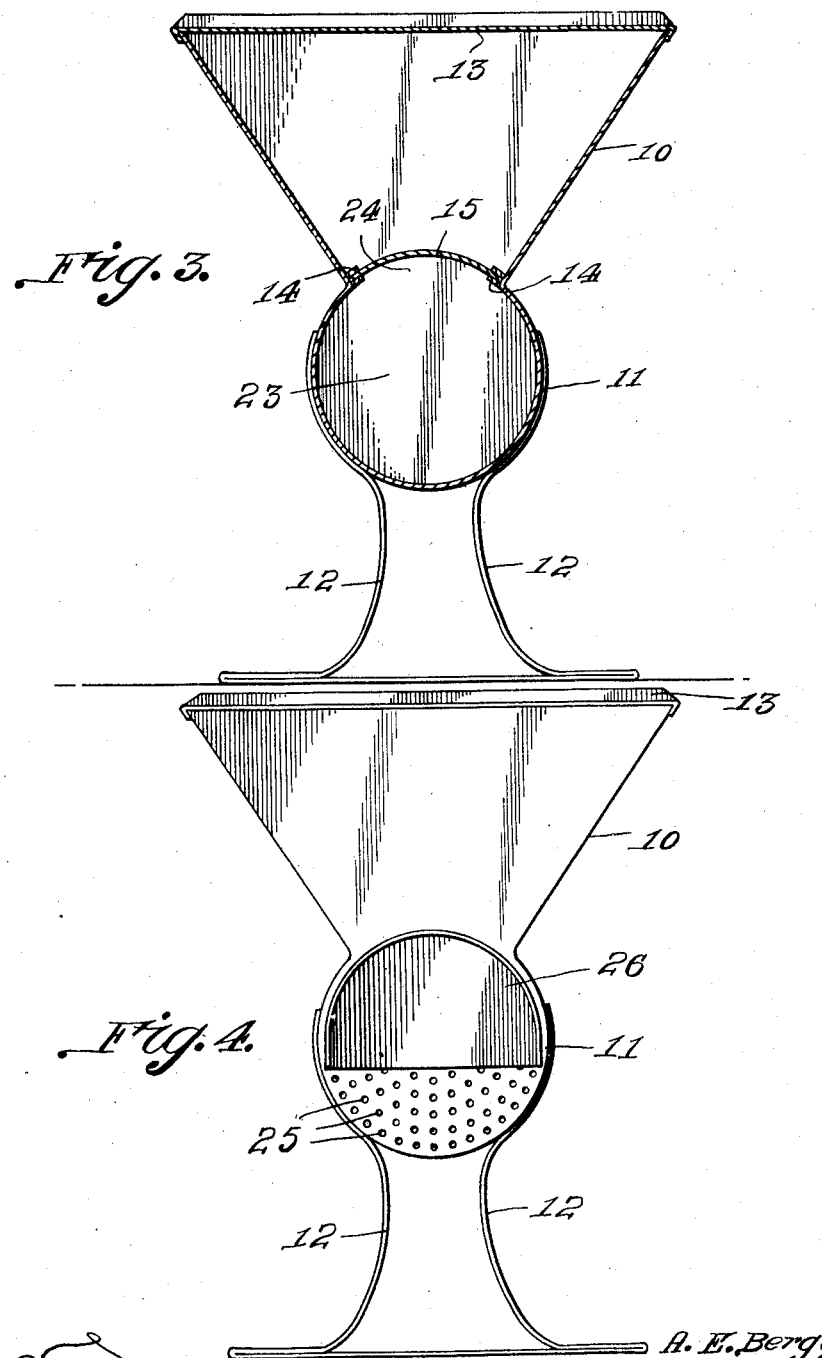

Patented June 7, 1927.

1,631,910

UNITED STATES PATENT OFFICE.

ARTHUR E. BERGQUIST, OF LINDSTROM, MINNESOTA.

POTATO-MASHING MACHINE.

Application filed September 4, 1925. Serial No. 54,558.

This invention relates to machines for the preparation of food and has for its object the provision of a novel device by means of which boiled potatoes, carrots or other vegetables, fruit and the like may be mashed or riced in a very rapid and efficient manner.

An important object is the provision of a vegetable treating machine of this character which is particularly designed for use in homes, restaurants or hotels, for the purpose of mashing or ricing potatoes and the like without it being necessary to perform the work manually by means of a beater or masher as is ordinarily necessary, there being consequently a great saving of time and labor as well as annoyance.

Another object of the invention is to provide a device of this character which will be more sanitary than the ordinary method inasmuch as it is unnecessary to touch the vegetables with the hands.

Yet another object is the provision of a machine of this type embodying a mashing chamber provided with closure means which not only operates to limit the quantity of vegetables or the like passing into the chamber but which acts also to retain the heat so that the food will be kept in a more palatable and attractive condition.

An additional object is to provide a device of this character which will be simple and inexpensive in manufacture, easy to use, rapid in action, efficient and durable in service, and a general improvement in the art.

With the above and other objects and advantages in view, the invention consists in the details of construction, and the arrangement and combination of parts to be hereinafter more fully described and claimed, and illustrated in the accompanying drawings, in which:—

Figure 3 is a vertical cross section looking in one direction, and

Figure 4 is a vertical cross section looking in the other direction.

Figure 1:
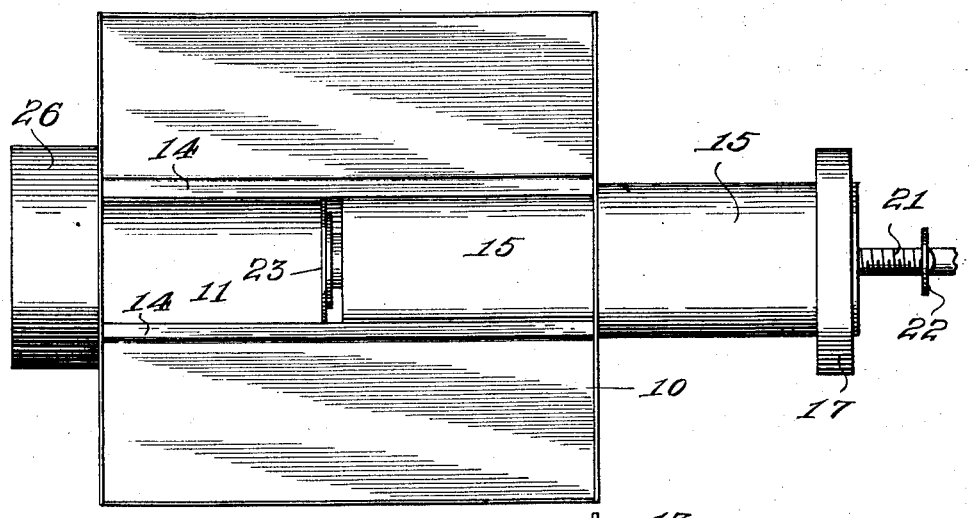
Figure 1 is a plan view of the device.
Figure 2:
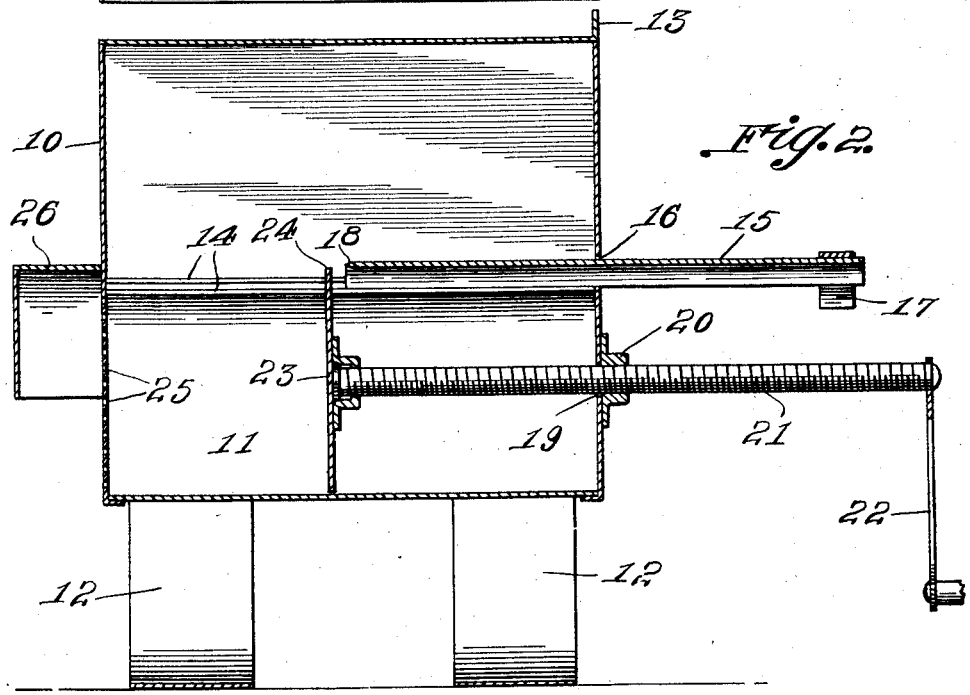
Figure 2 is a vertical longitudinal section.

Referring more particularly to the drawings, I have shown the device as comprising a receiving hopper 10 at the lower portion of which is mounted a cylindrical member 11 which may be formed integrally with the hopper or as a separate element attached thereto by any suitable means. The assembled hopper and chamber member 11 are supported upon suitable legs 12 so that the member 11 will be elevated above the top of the table or other support upon which the device is used to a sufficient extent that a receiving dish may be disposed beneath the member 11. The hopper 10 is preferably provided with a cover 13 which is removable when it is desired to place potatoes, fruit or in fact any cooked material into the hopper for the purpose of having it mashed or riced.

Located at the juncture of the hopper 10 with the cylindrical member 11 are guides 14 within which is slidably mounted a closure or cutoff plate 15 which is slidable through a suitable slot 16 in one end of the device and which is equipped with a handle 17 whereby it may be moved back and forth as desired. The other end of this cutoff plate is preferably sharpened as indicated at 18 for a reason which will be hereinafter explained.

One end of the cylindrical member 11 is formed with a hole 19 and is equipped at its outside with a stationary nut 20 through which is screwed a threaded rod or screw 21 equipped at one end with a suitable handle 22 and provided at its other end with a swivelly mounted follower 23 restrained against rotation by means of a projection 24 which extends between the guides 14. At its opposite end the cylindrical member 11 is formed with a plurality of perforations 25 above the entire group or series of which is mounted a shield 26.

In the operation of the device, the cutoff plate 15 is moved to extend across the cylindrical chamber to form a closure therefor, the cover is removed from the hopper or slid to partially open position, and the potatoes or other material to be mashed are placed within the hopper 10. The operator then grasps the crank handle 22 and rotates the screw 21 in a counter-clockwise direction to retract the follower 23, after which the cutoff plate 15 is pulled out to permit the material within the hopper to drop into the cylindrical member or chamber 11. The operator then pushes the cutoff plate 15 into its closed position, the sharpened edge 18 thereof cutting through any material or vegetables which may be in the way. It is then merely necessary to grasp the handle 22 and rotate the screw 21 in a clockwise direction so that the follower 23 will be moved longitudinally within the chamber or cylindrical member 11, the potatoes or other material in advance thereof being forced through the perforations 25 and dropping down into whatever dish or other receptacle may be placed in the proper position. The shield 26 operates to deflect the material downwardly into the dish or receptacle. Obviously, if the device is used in a restaurant, hotel or the like, individual orders of vegetables or the like may be mashed or pressed out of the machine as necessary, the existence of the closer plate 15 being of importance in that the heat of the vegetables or other articles will be retained so that their condition will be more attractive. Obviously, all the material within the hopper will not necessarily be deposited into the cylindrical member or chamber at once and after the member 11 has been once emptied an additional supply may be admitted thereto in exactly the same manner as above described. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:

A potato mashing machine comprising a supporting base, a horizontally arranged cylindrical compression chamber mounted on the base and having one wall imperforate and its other wall formed with a plurality of perforations, an inverted frusto pyramidal hopper located above and communicating with said chamber and coextensive in length therewith, pairs of spaced guide flanges located at the juncture of said chamber with the hopper, a cutoff plate arcuate in cross section and complementary to the compression chamber slidably mounted for longitudinal movement along said pairs of guide flanges, a follower mounted within said compression chamber and having a portion extending into the opening at the juncture of the hopper with the chamber to prevent rotation, and an operating screw threaded through a nut member at the imperforate end of the chamber and having a swivel connection with the follower.

In testimony whereof I affix my signature.

ARTHUR E. BERGQUIST.